(12) United States Patent
Ciaramitaro et al.

(10) Patent No.: US 7,058,661 B2
(45) Date of Patent: Jun. 6, 2006

(54) SYSTEM AND METHOD FOR ELECTRONICALLY MANAGING DISCOVERY PLEADING INFORMATION

(75) Inventors: Barbara L. Ciaramitaro, Grosse Pointe Woods, MI (US); Michael A. Gruskin, West Bloomfield, MI (US); Edward C. Wolfe, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/884,016

(22) Filed: Jul. 2, 2004

(65) Prior Publication Data

US 2005/0010601 A1    Jan. 13, 2005

Related U.S. Application Data

(60) Provisional application No. 60/484,731, filed on Jul. 3, 2003, provisional application No. 60/485,540, filed on Jul. 8, 2003.

(51) Int. Cl.
G06F 17/30    (2006.01)

(52) U.S. Cl. ........................................ 707/104.1; 707/5
(58) Field of Classification Search ................ 707/2–5, 707/104.1
See application file for complete search history.

(56) References Cited

U.S. PATENT DOCUMENTS 5,940,800 A * 8/1999 Bennett et al. ................. 705/1
6,549,932 B1 * 4/2003 McNally et al. ............ 709/202
6,738,760 B1 * 5/2004 Krachman ...................... 707/3
2003/0002445 A1 * 1/2003 Fullana et al. .............. 370/241
2003/0097425 A1 * 5/2003 Chen .......................... 709/220

OTHER PUBLICATIONS

Aggarwal et al. "On the Design of a Learning Crawler for Topical Resource Discovery." ACM Transactions on Information Systems (TOIS), vol. 19, No. 3, pp. 286-309. Jul. 2001. ACM Press.*
Oussalah et al. "How to Reuse Former Queries to Facilitate the Formulation of New Ones." 2000 International Database Engineering and Applications Symposium, pp. 92-100. Sep. 2000. IEEE Press.*
Chen et al. "A Fine-Grained Replacement Stategy for XML Query Cache." Procs. of the Fourth International Workshop on Web Information and Data Management, pp. 76-83. Nov. 2002. ACM Press.*

* cited by examiner

*Primary Examiner*—Safet Metjahic
*Assistant Examiner*—Brian Goddard
(74) *Attorney, Agent, or Firm*—Kathryn A. Marra

(57) ABSTRACT

A system and method for electronically managing discovery pleading information in which a user having an instant discovery request can search a repository to access prior discovery requests and corresponding responses to aid in formulating a response to the instant discovery request. The corresponding prior discovery responses include the documentary and other information previously produced in response to the prior discovery request, and may also include the text of the response itself. In this way the inventive system and method promotes efficiency and consistency in responding to discovery requests.

33 Claims, 14 Drawing Sheets

SYSTEM AND METHOD FOR ELECTRONICALLY MANAGING DISCOVERY PLEADING INFORMATION

CROSS REFERENCE TO RELATED APPLICATIONS

This application claims priority to U.S. Provisional Application Ser. No. 60/484,731, filed Jul. 3, 2003 and to U.S. Provisional Application Ser. No. 60/485,540, filed Jul. 8, 2003, which are incorporated by reference herein in their entirety.

BACKGROUND OF THE INVENTION

The present disclosure relates generally to managing legal documents, and, in particular, to a system and method for electronically managing discovery pleading information.

Legal matters often involve large volumes of information that must be organized and categorized in response to particular inquires or issues, such as litigation pleadings, business transactions, government regulations, and other legal matters. The information is typically managed by a centralized organization, such as a legal department or group therein having document coordinators. Managing this legal information often requires organizing both textual pleading information as well as discovery documents produced in response to discovery requests associated with the pleadings.

Existing methods for managing pleading information often result in inconsistent responses across similar discovery requests. Although current litigation support systems may support the storage of historical pleading textual information and produced document information, they do not provide a link between these two repositories. This is especially true when a link is sought on an enterprise basis (i.e., the ability to compare responses in different cases or matters). Typically, pleading textual information is stored in one repository and produced document information is stored in a separate repository. There is no automated method of determining the documents that were produced in response to a discovery request associated with a particular pleading. A document coordinator must keep track of the produced documents and tie them to one or more pleadings. An attorney responding to a new discovery request does not have visibility to previous pleadings that contain similar discovery requests nor does the attorney have visibility to documents that were produced in response to similar discovery requests. This can occur both for pleadings in the same case or matter as well as for similar pleadings in different cases or matters that involve similar issues. The attorney can attempt to get this information from the document coordinators but this can be time consuming and hit or miss because the document coordinator may track tens of thousands of discovery requests and corresponding produced document information. This does not result in a high level of confidence in the ability to accurately and consistently respond to similar pleadings and discovery requests.

Inconsistent responses across similar discovery requests may result in claims of intentionally incomplete or inaccurate responses. Inconsistent responses involve both the textual responses to discovery pleadings as well as the documents and other information produced in response to the discovery request. Thus, it is desirable for a litigation support system to provide consistency in textual and production responses by allowing the storage and retrieval of historical pleading textual information and produced document information. This consistency needs to exist both within a specific case or matter, as well as across different cases or matters involving similar issues. Ideally, to ensure the greatest level of consistency and accuracy in litigation responses, it would be desirable if the system could link the historical pleading textual information and the produced document information.

BRIEF DESCRIPTION OF THE INVENTION

According to one aspect of the invention, a system and method are provided for electronically managing discovery pleading information in which a user having an instant discovery request can search a repository to access prior discovery requests and corresponding responses to aid in formulating a response to the instant discovery request. The corresponding prior discovery responses include the documentary and other information previously produced in response to the prior discovery request, and may also include the text of the response itself. In this way the inventive system and method promotes efficiency and consistency in responding to discovery requests.

In another aspect of the inventive system and method for electronically managing discovery pleading information, the prior discovery responses accessible in the searchable repository include links to copy the documentary and other information previously produced in response to the prior discovery request for production in response to the instant discovery request. Similarly, a link may be provided to copy the text of the prior discovery response for inclusion in the response to the instant discovery request where appropriate. As a result, the inventive system and method promotes efficiency and consistency in responding to the instant discovery request.

BRIEF DESCRIPTION OF THE DRAWINGS

Referring to the exemplary drawings wherein like elements are numbered alike in the several FIGURES.

DETAILED DESCRIPTION OF THE INVENTION

Figure 1:
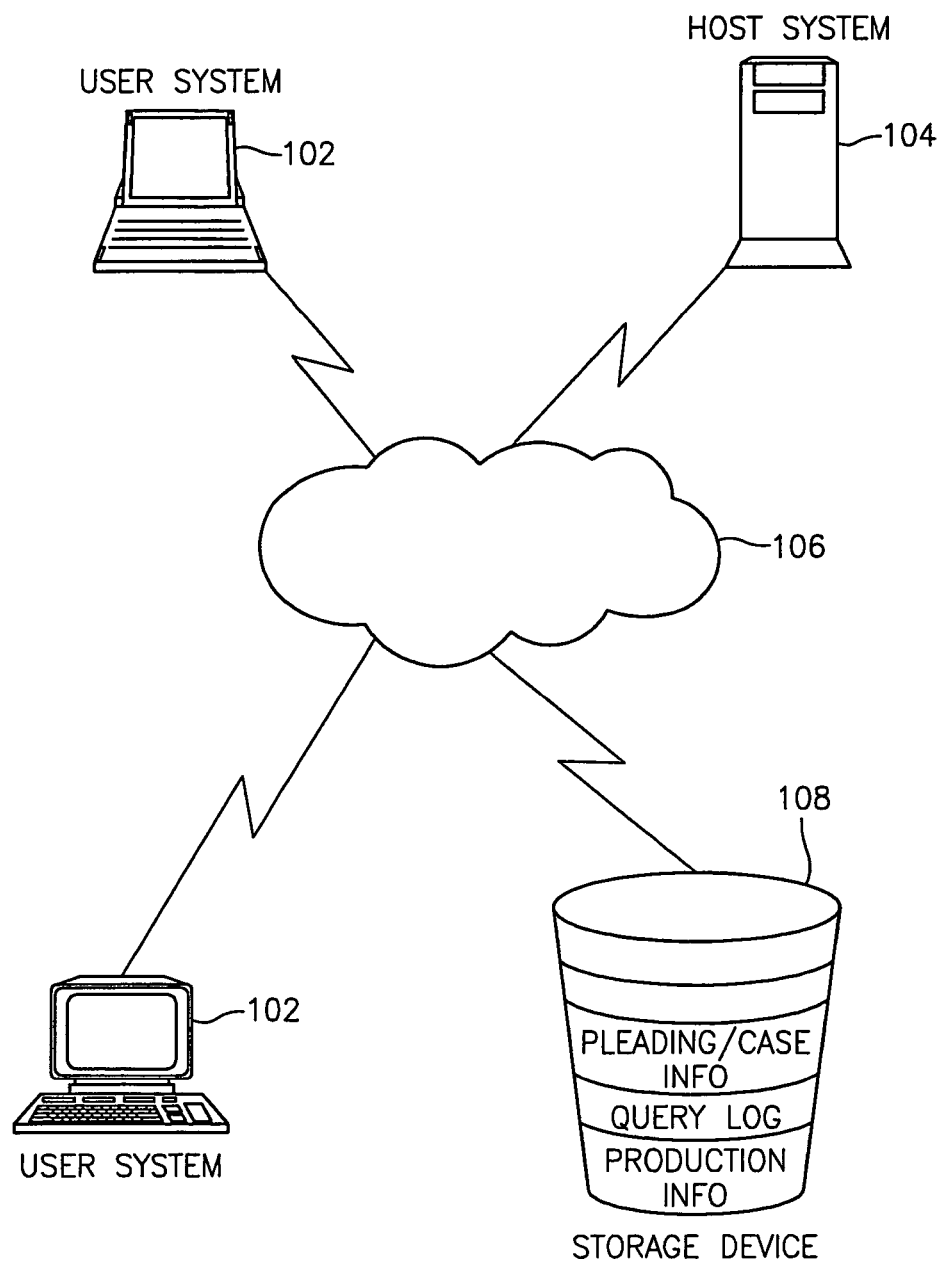
FIG. 1 is a block diagram of an exemplary system for managing pleadings.

Referring to FIG. 1, a block diagram of an exemplary system for managing pleadings is generally shown. The system includes a litigation support application (LSA) that is executed by one more computer programs located on the host system 104. The LSA manages litigation information and provides computer processes to perform activities in support of legal matters. In particular, the LSA supports the collection, storage, retrieval and review of discovery information for litigation, regulatory or other matters where discovery information needs to be assembled. Discovery information is associated with one or more elements of a pleading and includes documents such as drawings, test results, reports, letters, data, computer files, records and any other type of information in any form that is sought after in a pleading request and/or used in a pleading response (documents are also referred to herein as documentary and other information). It will be appreciated that a several related documents may be grouped together as a composite document such that the composite document may be treated as a single grouped document or each as individual documents in the LSA that can be separately or individually reviewed for document decisions. A detailed description of the related invention related to electronic management of composite documents in LSA is found in commonly assigned patent application Ser. No. 10/884,009 entitled "System and Method for Electronically Managing Composite Documents", filed the same day as the present application, Jul. 2, 2004 and which is herein incorporated by reference in its entirety.

A pleading is a discovery request such as an interrogatory, letter request, request for production, request for admission, initial disclosure, subpoena, or any other type of discovery related request seeking information, data or documents. One of the functions performed by the LSA system is the management of pleadings to provide the ability to respond to discovery requests consistently and accurately.

The computer programs to execute the pleading management functions are located on the host system 104 and include two modules: a question and answer information module and a question and answer search module. The question and answer information module is a case centric model, where a case refers to a legal matter that may contain one or more pleadings. Once a user identifies a case, all pleadings and pleading elements within the specified case will be available for viewing and editing. A pleading element is an individual request (or question), an individual response (or answer), or a specific portion of a request or response. The question and answer information module allows for adding new pleadings and pleading elements. Once the user has identified a case, the question and answer information module allows a user to view, edit and add three types of information: case information (view), pleading textual information (view, edit, add), and question/response information (view, edit, add). The second module, the question and answer search module, allows the user to search for question and answer records based on the case, pleading, question (number and/or text) and/or response (level and/or text) information. You can also search for similar questions and answers across cases using the question and answer module.

The system depicted in FIG. 1 includes one or more user systems 102 through which users at one or more geographic locations may contact the host system 104. The host system 104 executes computer instructions for managing pleadings (e.g., the question and answer information module, and the question and answer search module) and the user systems 102 are coupled to the host system 104 via a network 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g. a web browser) to contact the host system 104 through the network 106. In another exemplary embodiment, the user system 102 is connected directly (i.e., not through the network 106) to the host system 104 and the host system 104 is connected directly to or contains the storage device 108.

The storage device 108 includes data relating to managing pleadings and may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. Information stored in the storage device 108 may be retrieved and manipulated via the host system 104 and/or via the user system 102. A data repository containing prior pleadings (also referred to herein as discovery requests) and corresponding discovery information (also referred to herein as responses) is located on the storage device 108. The data repository contains one or more historical pleading databases containing data related to historical pleadings, historical pleading information and discovery information. A historical pleading is a pleading or an element of a pleading that is stored in a database on the storage device 108. Historical pleading information refers to pleading textual information stored in a database on the storage device 108 that relates to prior pleadings or to one or more elements thereof. Pleading textual information refers to the textual information associated with the pleading document itself or an element thereof including the text of the request and the response. An element of a pleading is an individual request or question, an individual response, or a specific portion of a request or a response.

Also stored in storage device 108 are search query logs and various production related information. Search query logs contain data to track new and reusable search queries. A production refers to discovery information that is delivered to an opposing counsel in response to a request for information. A production may include legends and numbering. Legends refer to a common footer placed on each page of a set of documents produced that provides a reference to the case or matter in which the production occurred. Each page of a document included in a production is individually and sequentially numbered with a production prefix and number associated to the case or matter in which the production occurred. Production related information includes information such as a production set and a working production set. A production set refers to a set of discovery information gathered for a particular pleading (excludes the pleading text) and a working production set is the production set associated with a working pleading. A working pleading (or instant pleading), as referred to herein, is the pleading currently selected by the user to retrieve related historical pleading information and/or to work on a production request. A working pleading is any element of the pleading and may include a telephone call, an inquiry, a deposition, or any other request for information. Further, a working pleading may be a standing collection. A standing collection is a group of data, documents and other information related to a particular subject matter (e.g., a product line, a case matter, an allegation type, a date range, a business transaction or any other grouping of particular interest).

Databases in the data repository on the storage device 108 are contained in either a privileged schema or a non-privileged schema. The privileged schema contains documents that have been classified as privileged and the privileged portions of documents classified as partially privileged. For documents that were originally in the non-privileged schema and subsequently moved to the privileged schema, a placeholder indicating that the document has been removed for privilege may remain in the non-privileged schema. The non-privileged schema contains documents that have been classified as non-privileged. In addition, documents may be classified as partially privileged and include portions that are privileged and portions that are non-privileged. For partially privileged documents, a copy of the document with the privileged portions removed is stored in the non-privileged schema (along with a placeholder for each portion of the document that has been removed, the placeholder indicating the portion of the document that has been removed for privilege) and a full copy of the document is stored in the privileged schema. Access to the privileged and non-privileged schemas is based on the security levels associated with individual users. A detailed description of the invention of LSA having the privileged and non-privileged schema with appropriate document treatment is found in commonly assigned patent application Ser. No. 10/884,014 entitled "System and Method for Electronically Managing Privileged and Non-Privileged Documents", filed the same day as the present application, Jul. 2, 2004 and which is herein incorporated by reference in its entirety.

In exemplary embodiments of the present invention, the host system 104 operates as a database server and coordinates access to application data including data stored on the storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs (i.e., the question and answer information module, and the question and answer search module) to provide pleading management functions. One of the pleading management functions provided by the computer programs is a search tool to allow a user to search for information contained in the data repository. Processing may be shared by the user system 102 and the host system 104 by providing an application (e.g., java applet) to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
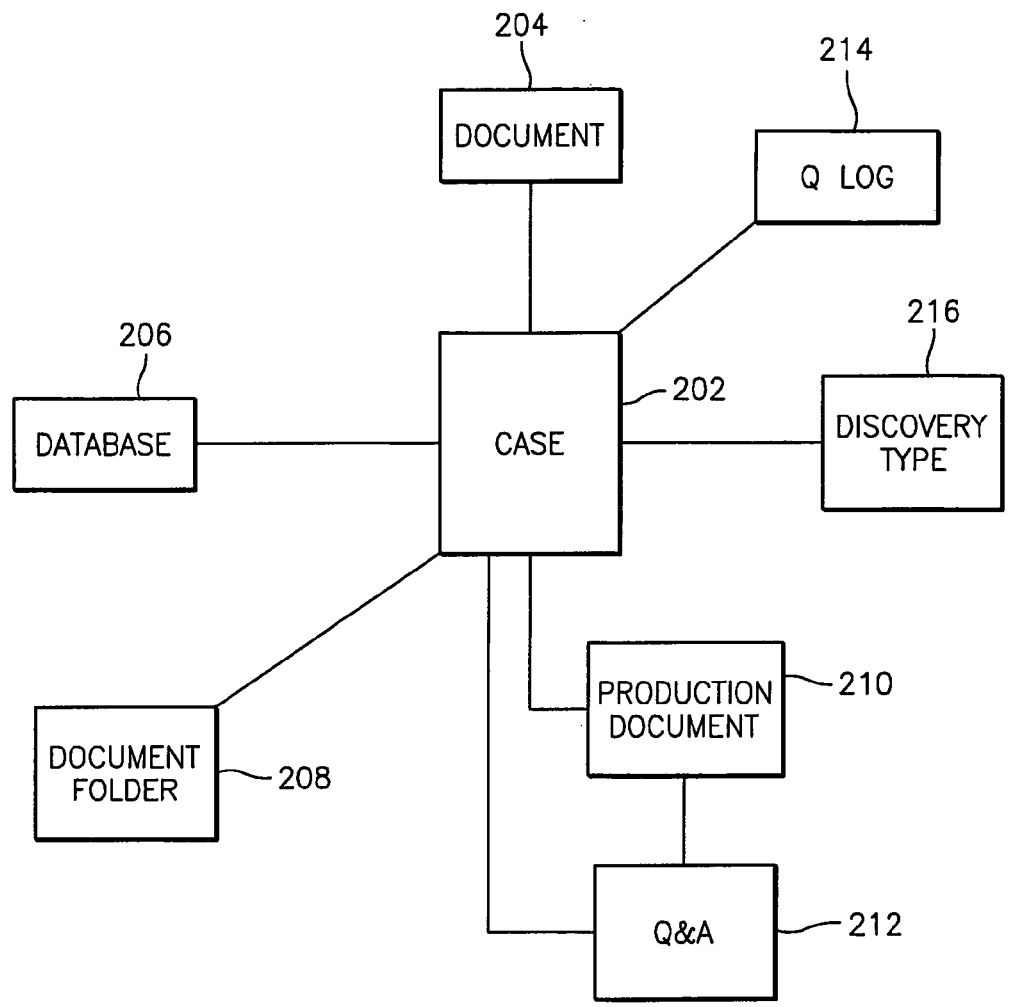
FIG. 2 is a block diagram of database tables utilized by exemplary embodiments of the present invention.

FIG. 2 is a block diagram of database tables containing historical pleading related data (e.g., historical pleadings, historical pleading information and discovery information) that are utilized by exemplary embodiments of the present invention. The tables are stored within one or more databases that are located on the storage device 108. Each database is located in either the privileged schema or the non-privileged schema. Duplicate copies of the databases (and the associated tables) directed to a particular case, legal department or other grouping may be located in both the privileged schema and the non-privileged schema. The tables in the non-privileged schema include records related to non-privileged data and the tables in the privileged schema include records related to privileged data. The case table 202 includes a record for each case and each record includes fields relating to the case such as a case number, case name, discovery related fields, and pleading related fields.

FIG. 2 also includes a document table 204 that includes one record for each document in the system. As used herein, a document includes drawings, test results, reports, letters, data, computer files, records and any other type of pleading related information in any form. In exemplary embodiments of the present invention, the document table 204 includes fields for: a unique document identifier; a database identifier to identify the database where the document is located; a privilege status for the document field (e.g., partially privileged, fully privileged, and non-privileged) and a document privilege category (e.g., attorney work product, and attorney client privileged). Also included in the document table 104 may be case number, product information and issue information, as well as dates and user-ids associated with any updates. A typical document table 204 may include over a hundred fields for searching on characteristics of the document. Documents are reviewed and decisions (e.g., production status, privilege status and privilege category) applied to documents by users with access to the LSA as well as by remote reviewers who do not have access to the LSA. A detailed description of the invention of LSA for remote review of documents is found in commonly assigned patent application Ser. No. 10/884,010 entitled "System and Method for Electronically Managing Remote Review of Legal Documents", filed the same day as the present application Jul. 2, 2004 and which is herein incorporated by reference in its entirety.

FIG. 2 also depicts a database table 206 that includes fields to associate a document to a particular database. Also shown in FIG. 2, is a document folder table 208 to specify the connection between a document and one or more folders. A folder is a collection of related documents. A subset of the fields in the document folder table 208 includes a unique folder identifier, a document identifier, and a database identifier for the folder. FIG. 2 also depicts a production document table 210 which includes fields for tracking discovery information that has been produced. Fields in the production document table 210 may include: a unique production document identifier; a production folder identifier; a production identifier; a document identifier that points to the source document; pleading and discovery information fields; and a production privilege category (e.g., partially privileged, fully privileged, and non-privileged) and status (e.g., locked, unlocked). A locked production document is a document included in a production folder where all production activities such as production numbering and printing have been completed and in which production decisions can no longer be modified. An unlocked production document is a document included in a production folder where a new production decision or modification of an existing production decision can be applied to the document. A production folder includes documents related to the same production. The discovery set identifier field (which holds a discovery tracking number) enables discovery information (both produced and non-produced) to be linked to corresponding pleadings, questions, and answers. Questions are also referred to herein as 'requests' in that a question may include a request for information, a request for samples, admission of facts, etc. The question and answer (Q&A) table 212 includes fields related to pleadings, questions and responses. A subset of fields associated with Q&A table 212 include a pleading identifier; a question number; response number; question text; and response text fields.

Also depicted in FIG. 2 is a query log table 214 that contains data to track new and reusable search queries. Fields included in the query log table 214 may include a unique query identifier; a query; an ID associated with the query owner; a query date; a query name; and a query sort field. FIG. 2 also includes a discovery type table 216 that includes fields for specifying pleadings for which a single production response may be associated. The discovery type table 216 includes fields such as discovery name, pleading set number, and pleading type. A pleading type refers to any specific pleading type such as an interrogatory, a request for admission, a request for initial disclosure, etc. A mixed pleading is a pleading having different pleading types or more than one pleading type included therein. A pleading set includes pleadings with the same pleading type. A pleading set number is a chronological number assigned to pleading sets of the same type (e.g., interrogatories and mixed).

Figure 3:
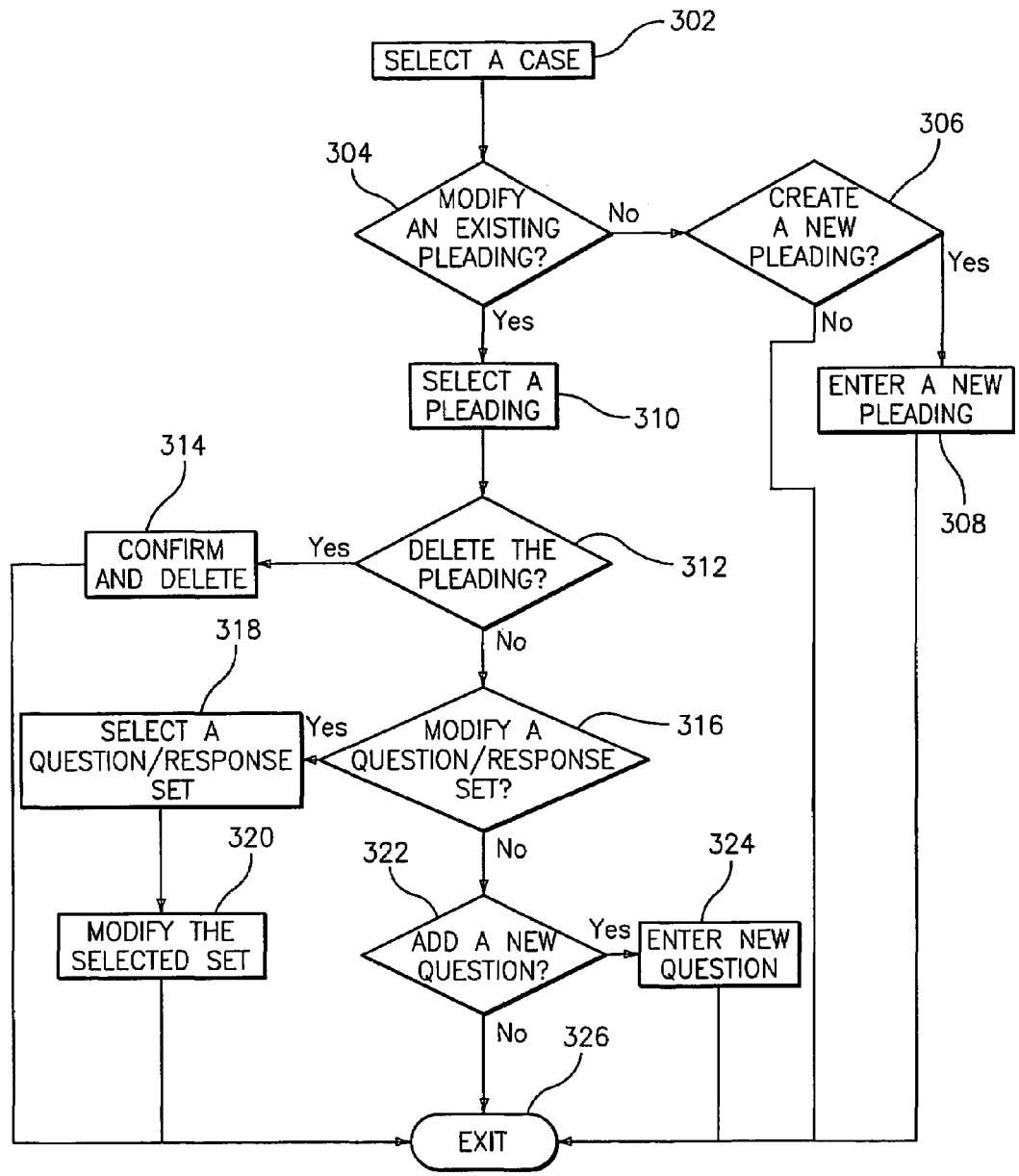
FIG. 3 is a flow diagram of an exemplary process for viewing, adding, and modifying pleadings for a selected case.

FIG. 3 is a flow diagram of an exemplary process, implemented by the question and answer information module, for viewing, adding, and/or modifying pleadings for a selected case. The process depicted in FIG. 3 is case centric and enables a user to view, edit, and add data for a pleading on a case-by-case basis. At 302, a user selects a case (e.g., via a search tool) by entering case search criteria (e.g., case name, case number, model number, and any other fields located in the case table) into a case retrieval screen such as the one depicted in FIG. 4 and described below. A list of cases fitting the search criteria are presented to the user. The user selects one of the cases and is presented with a case information screen for the selected case. An example of a case information screen is depicted in FIG. 5 and described below. The case information screen displays case heading information, pleadings in the case, productions in the case and documents associated with the case.

Figure 6:
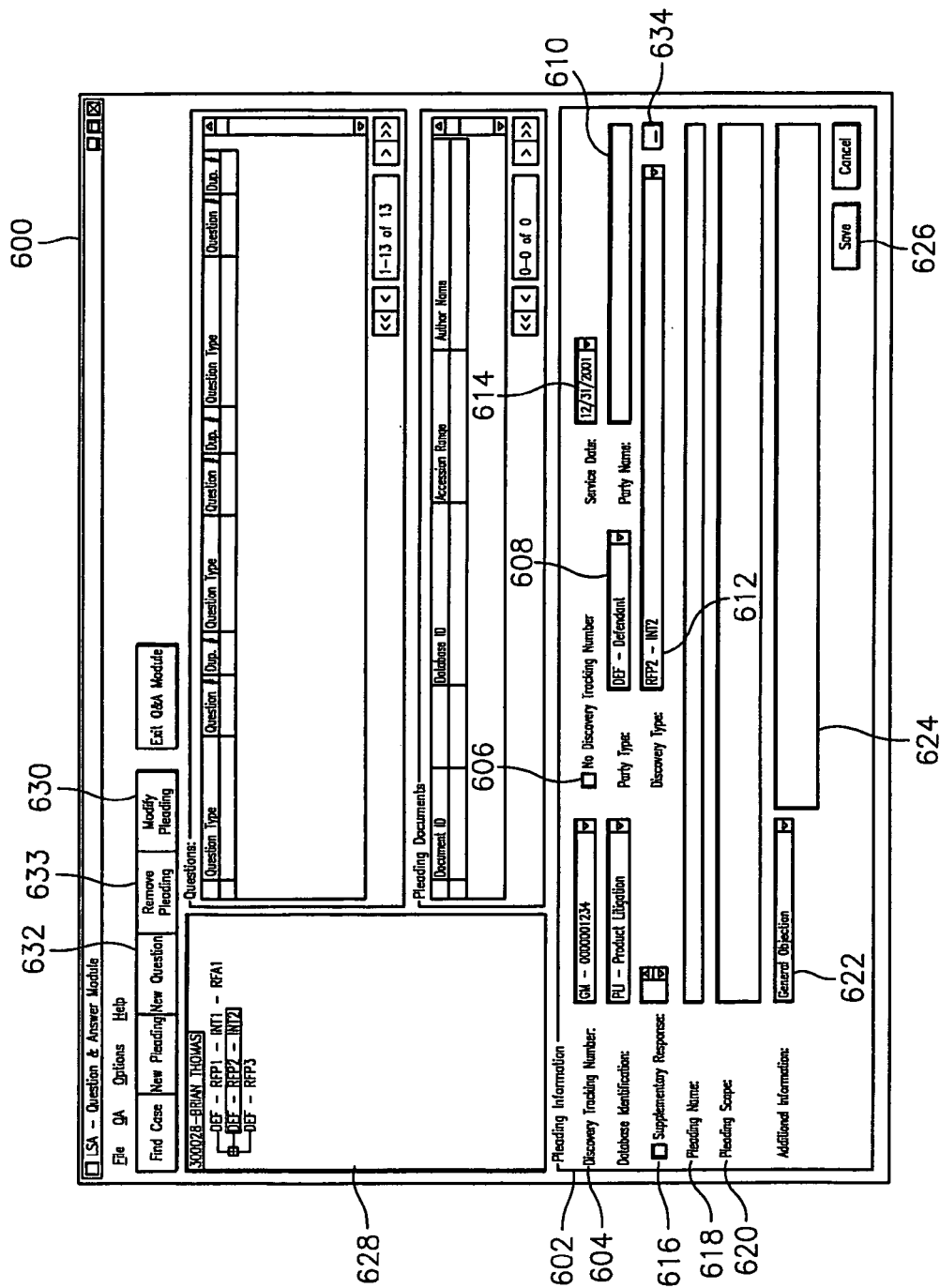
FIG. 6 is an exemplary pleading information user interface screen for viewing, editing, and/or adding pleading information relating to a particular case.
Figure 8:
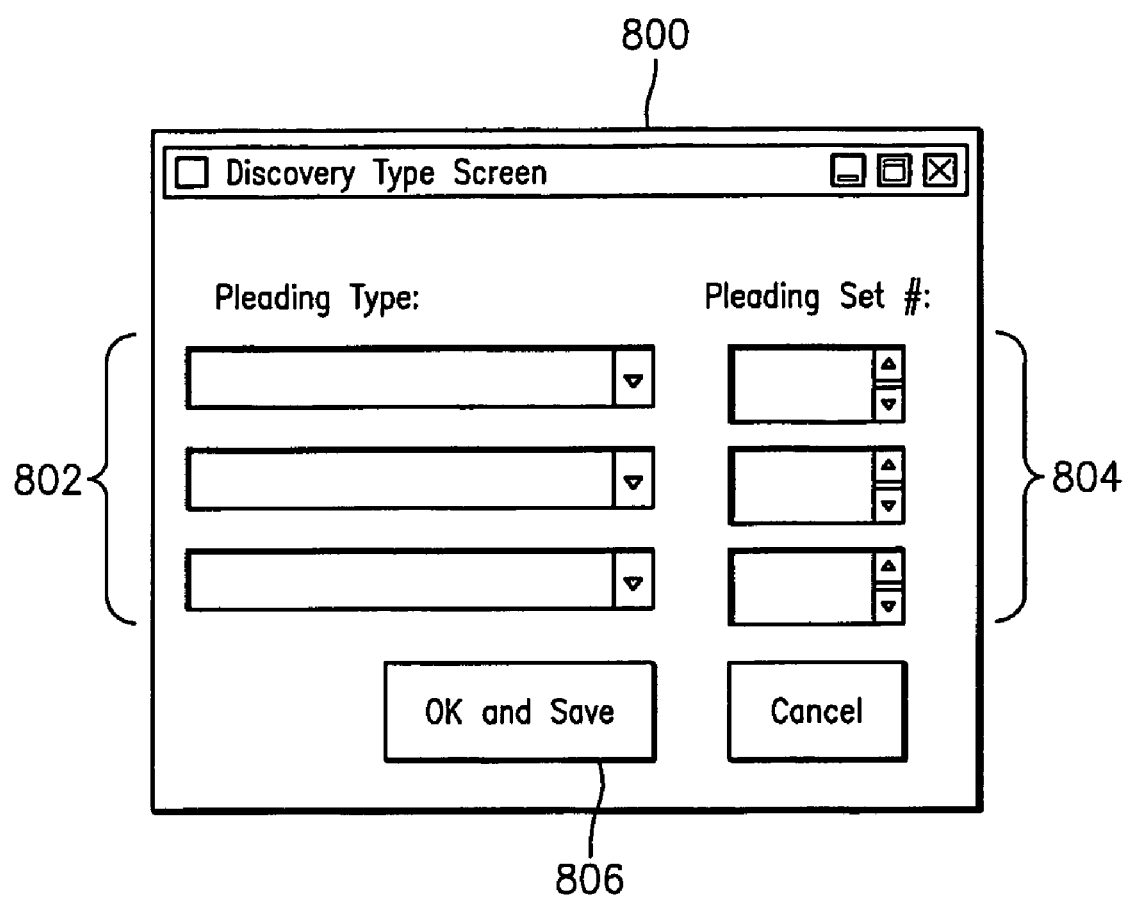
FIG. 8 is an exemplary discovery type user interface screen for specifying pleading types and sets for a pleading.

At 304, a user is presented with the option to modify an existing pleading if one exists in the case selected at 302. If the user does not select the modify an existing pleading option at 304, then 306 is performed and the user is presented with an option to create a new pleading. If the user selects create a new pleading at 306, then 308 is performed to enter pleading textual information for the new pleading via a pleading information screen. An exemplary pleading information screen is depicted in FIG. 6 and described below. At 308, the user may also initiate the creation of a discovery type name for the pleading. The discovery type name is formed by concatenating the party type (e.g., DEF for defendant), the pleading type (e.g., RFP for request for production and RFA for request for admission) and the pleading set (e.g., set 1). FIG. 8 depicts an exemplary discovery type user interface screen that may be utilized to create the discovery type name for the pleading. In addition, at 308, the user is given the option of linking the pleading to a discovery tracking number, where the discovery tracking number is a unique identifier associated with a production folder. This results in providing a link between the new pleading and the discovery documents that were produced in response to the pleading.

If the user selects modify an existing pleading at 304, then 310 is performed to select a pleading from the pleadings associated with the selected case. The user is then presented with a pleading information user interface screen such as the one depicted in FIG. 6 and described below. The pleading information user interface screen contains pleading textual information associated with the selected pleading and presents the user with the option to delete a pleading, to modify a question/response set or to add a new question. If it is determined at 312, that the user has selected delete the pleading, then 314 is performed to confirm that the user wants to delete the pleading. If the user confirms the deletion (and has the proper authority), then the pleading is deleted at 314. If the user does not select the option to delete the pleading at 312, then processing continues at 316. If it is determined, at 316, that the user has selected modify a question/response set then 318 is performed to select a question/response set from the pleading. A user interface screen such as the one depicted in FIG. 7 may be utilized to modify the question/response set at 320. If the user does not select the option to modify a question/response set at 316, then processing continues at 322. If it is determined at 322 that the user has selected add a new question, then 324 is performed to add a new question to the pleading. This may be performed via a user interface screen such as the one depicted in FIG. 7.

Figure 4:
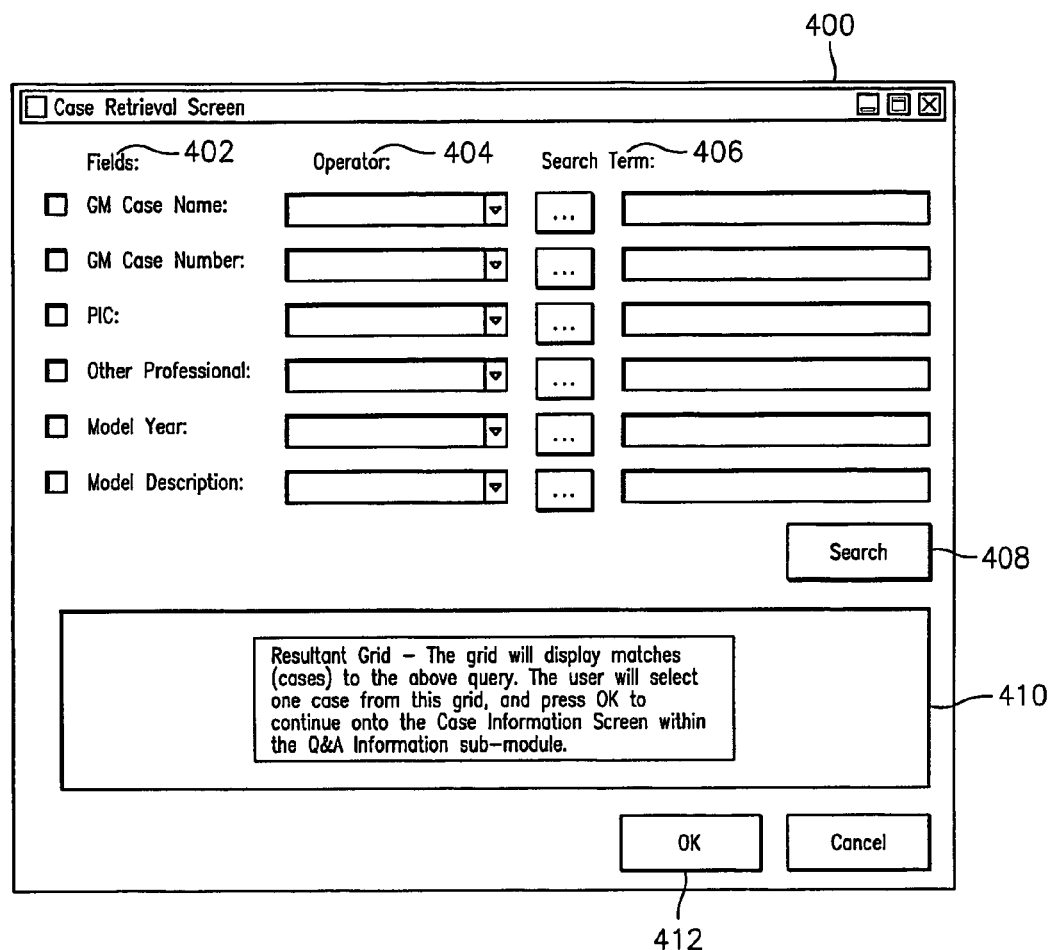
FIG. 4 is an exemplary case retrieval user interface screen for facilitating case searches.
Figure 5:
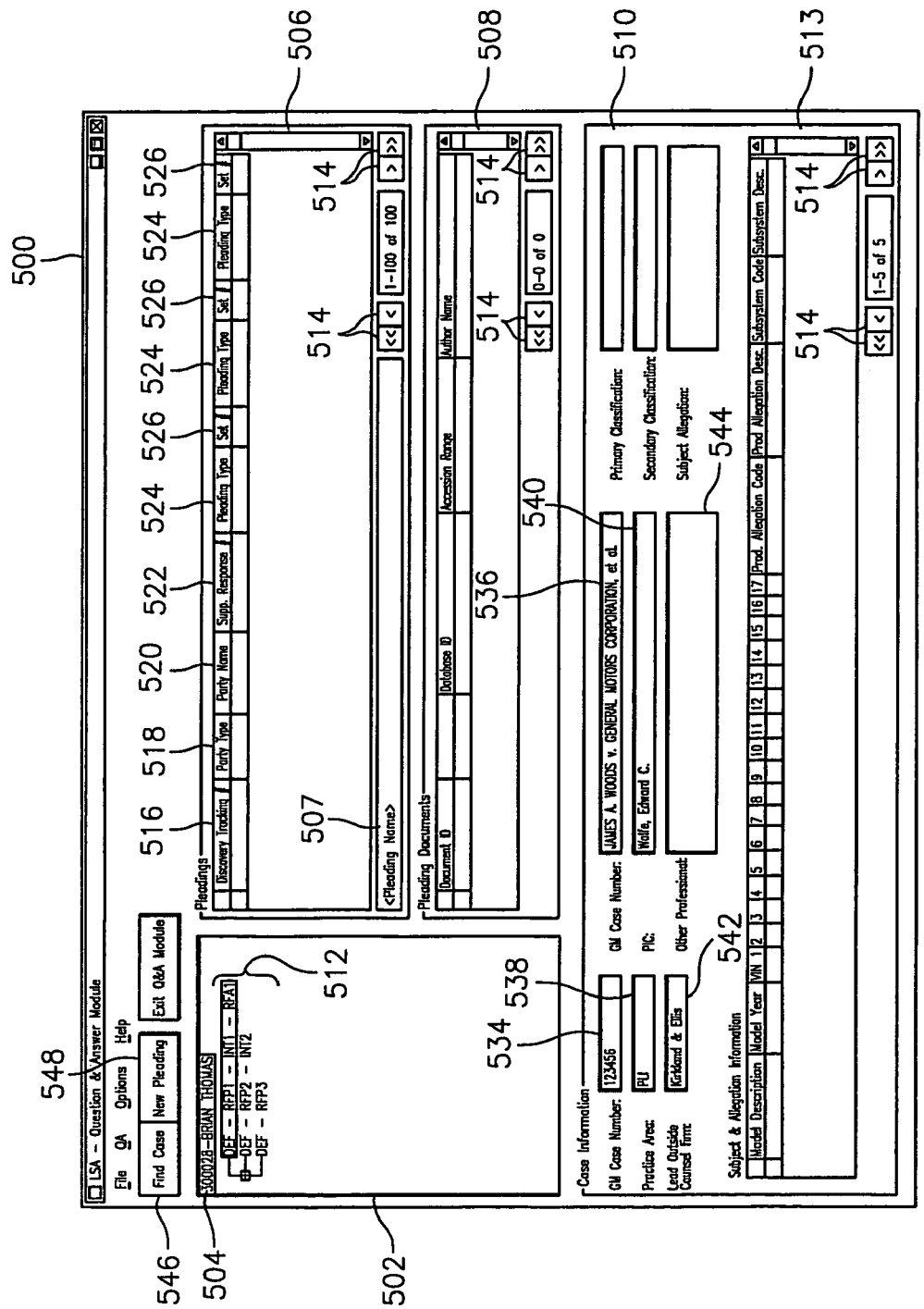
FIG. 5 is an exemplary case information user interface screen for viewing case information associated with a selected case.

An exemplary embodiment of a case retrieval user interface screen 400 is depicted in FIG. 4. The case retrieval user interface screen 400 includes various search fields 402 available to the user. Available search fields include case name, case number, a professional in charge (PIC) of the case, 'other professional' associated with the case (e.g., administrative support personnel), and one or more subject fields. For example, in a product liability case for an automotive manufacturer, subject fields may include model year, and model description. These subject fields are shown in FIG. 4 for illustrative purposes.

Also provided in FIG. 4 are operator fields 404 associated with each search field. Each of the operator fields 404, in turn, include a list of available operations that may be selected for the search fields 402. Operations may include 'equal to', 'not equal to', 'in', 'contains', 'not in', 'starts with', 'does not start with', 'does not contain', and 'ends with', among others. The case retrieval user interface screen 400 further includes search term fields 406 that enable a user to enter specific text to be searched. One or more of search fields 402, operator fields 404, and search term fields 406 may be selected by the user. The search is initiated by selecting the 'Search' button 408. The LSA searches databases (e.g., via the search tool) on the storage device 108 for cases that match the search criteria entered by the user. One or more cases relating to the search criteria entered are retrieved from storage device 108 and presented to the user via frame 410. To view a case, the user highlights the desired case in frame 410, followed by selecting 'OK' 412.

A sample case information user interface screen 500 is depicted in FIG. 5. The case information user interface screen 500 provides the user with the ability to view, edit and/or add specific pleadings, question and/or responses. The case information user interface screen 500 includes a question and answer (Q&A) folder tree 502, which displays the available pleadings for the selected case. The folder tree 502 is organized in three levels: case folder, pleading folder, and question/responses. As indicated above, a question is also referred to herein as a 'request' in that a question may include a request for information, samples, admission of facts, etc. The case folder 504 (e.g., 300028 BRIAN THOMAS) represents the highest level. Within each case folder 504, one or more pleading folders 512 are provided. Each pleading folder 512 further comprises one or more question/response sets (not shown). For the selected case, the case information user interface screen 500 presents a pleadings frame 506, a pleading documents frame 508, a case information frame 510, and a case subject and an allegation information frame 513. Navigation buttons 514 are provided within each frame for scrolling between records displayed in the frame.

The pleadings frame 506 lists the pleadings contained in the case folder 504 that are selected in the folder tree 502. Specifically, the pleadings frame 506 displays the pleading name in a pleading name field 507, the discovery tracking number (if the pleading is associated with a production) in a discovery tracking number field 516, the party type in a party type field 518 (e.g., Plaintiff, claimant, Buyer, etc.), the party name in a party name field 520, a supplemental response number in a supplemental response number field 522, the pleading type in a pleading type fields 524, and set number in a set number field 526. The supplemental response number field 522 is an optional field used to specify the response number when the entity files an additional, or supplemental, response to the initial (or previous) pleading.

The contents of the pleading documents frame 508 will vary depending upon the level of the hierarchy (e.g., case folder level 504, pleading folder 512, or a question/response level) selected in the folder tree 502. For example, when the case folder level 504 is selected, all of the pleading documents and text available for all of the pleadings assigned to the case are displayed. When the pleading folder level (e.g., one of folders 512) is selected, all of the pleading documents and text available for the selected pleading are displayed. When the question level (not shown) is selected, the pleading documents and text available for the pleading, which contain the selected question, are displayed.

The case information frame 510 provides general case information such as the case number in a case number field 534, the case name in field 536, the practice area (e.g., Labor) in a practice area field 538, the professional in charge in a professional in charge field 540, the lead outside counsel firm in a lead outside counsel field 542, other professionals involved with the case in an other professionals field 544, and similar types of information.

Various options provided via the case information user interface screen 500 include finding a case, adding a new pleading, and editing an existing pleading. The LSA enables a user to search for another case while retaining the information retrieved for an existing case. The user searches for another case by selecting the 'find case' button 546, which causes the process to return to the case retrieval user interface screen 400.

The user adds a new pleading to the existing case by selecting 'new pleading' 548 via the case information user interface screen 500. Alternatively, the user may 'right click' on the case folder 504 whereby a pop-up window (not shown) provides an option 'new pleading' for selection. Selecting either of these options will result in a pleading information screen such as the one depicted in FIG. 6.

A user may edit an existing pleading by highlighting the pleading folder (e.g., one of folders 512) in the folder tree 502. This action causes pleading information to be displayed on a user interface screen such as the pleading information screen depicted below in FIG. 6 for the selected pleading.

An example pleading information user interface screen 600 is depicted in FIG. 6. The pleading information user interface screen 600 is utilized to view, edit and add pleading information. It includes a pleading textual information frame 602 for entry and/or modification of pleading textual information. The discovery tracking number in field 604 is used for linking the new pleading to a production set that was previously created for the pleading. The discovery tracking number is created via the LSA at the time a discovery set for the case was created. For example, if a pleading specifies a request for production, in addition to entering this pleading textual information into a pleading folder for the case, a user would also create a production folder in which to associate the pleading via the LSA. When a production folder is created, the LSA automatically assigns a discovery set tracking number to the production folder. The user retrieves a document to be associated to the production folder. The document is then associated (either by making a physical copy or by providing a link) with the production folder. Once the production folder is created for the case, the user then reviews available documents (e.g., in a document database using document table 204) for production.

Once a production set has been completed, the user can link a pleading to the production set in the production folder via the discovery tracking number in field 604. When a new pleading is added, a drop down list of available discovery tracking numbers is provided in field 604, if applicable. These numbers come from the discovery sets identified in pleadings frame 506 of FIG. 5. Once this discovery set number has been entered, the new pleading is effectively linked to the discovery information described above. Once the new pleading is linked to the discovery information, a direct access (e.g., immediately accessible in real time) is provided to the discovery information. If no productions are applicable, the user may leave this field 604 blank and check the 'No discovery tracking number' box 606 in frame 602 if desired. Party type field 608, party name field 610, and discovery type field 612 will be automatically populated by the LSA utilizing the production information in storage device 108 that is linked via the discovery tracking number. The service date field 614 reflects the date on which the pleading was served. The supplementary response field 616 specifies a response number that is created when the entity files an additional, or supplemental, response to the initial pleading. The supplementary response field 616 is optional.

The user enters the pleading name in a pleading name field 618. The user may optionally enter the pleading scope (e.g., in response to Plaintiff's interrogatories) in a pleading scope field 620 if desired. The user may further provide additional information via fields 622 and 624. The title field 622 enables a user to specify the title used to identify the additional information being included in the pleading. Options available for selection in the title field 622 include 'other', 'general objection', 'general definition', 'instructions', 'preamble', among others. The additional information text is entered in the additional information field 624. Selecting the 'save' button 626 adds the new pleading to the folder tree 628. The contents of a newly created, or existing pleading may be viewed and managed through the pleading information user interface screen 600.

Another option available via the pleading information user interface screen 600 depicted in FIG. 6 includes specifying or modifying discovery type data for a pleading. This option is initiated by selecting the discovery type button 634 on screen 600. A discovery type name is generated for the pleading by the LSA. The discovery type name is created by concatenating the party type (e.g., DEF-defendant), pleading type (e.g., RFP-Request for Production, Request for Admission, Request for Initial Disclosure, etc.), and pleading set (e.g., set 1 of an Interrogatory). Other pleading types available for selection in creating a discovery type name include notice of deposition, interrogatory, duces tecum, request for admission, request for initial disclosure, subpoena, etc. Upon selecting the discovery type button 634, a discovery type user interface screen such as the one depicted in FIG. 8, described below is presented to the user.

The pleading information user interface screen 600 is populated with the relevant pleading information associated with the selected pleading. With proper permissions, the user may delete a pleading, add a new question to a pleading, and/or modify the currently selected pleading. The current pleading may be deleted by selecting the 'remove pleading' button 633. The user may add a new question to a selected pleading by clicking on the 'new question' option 632 or by 'right-clicking' on the desired pleading folder (e.g., one of folders 512). A sub-window (not shown) is presented with an option to add a new question. The LSA then presents the user with a blank question/response information user interface screen, a sample of which is shown in FIG. 7.

Figure 7:
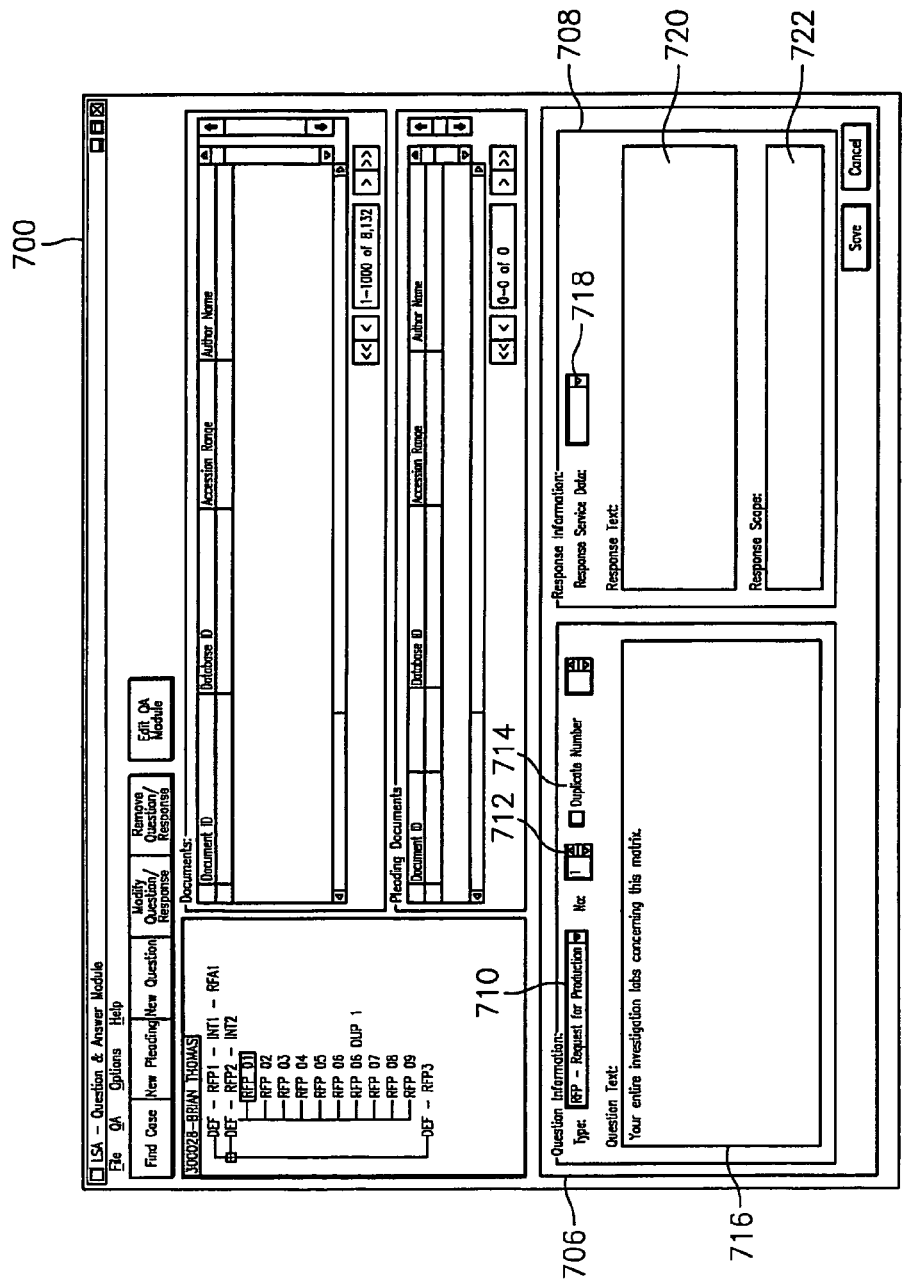
FIG. 7 is an exemplary question/response information user interface screen for viewing, editing, and/or adding pleading question and response information for a particular pleading.

FIG. 7 depicts a question/response information user interface screen 700 that may be used to view, edit, and/or add specific question/response information to a particular pleading. The user enters question/response information in frames 706 and 708 of the user interface screen 700. The question information frame 706 includes a question type field 710, a question number field 712, a duplicate number field 714, and a question text field 716. In an exemplary embodiment of the present invention, the question type field 710 includes a picklist that is populated with up to three pleading types that make up the pleading's discovery type. The question number field 712 specifies the question number selected for the pleading, and the duplicate number field 714 specifies the duplicate question sub-part of the question in the event that a pleading contains similarly numbered questions (e.g. two Interrogatories numbered 5). The question text field 716 provides the means to enter the new question text and also displays existing question text for a question that is selected for modification. The response information frame 708 includes a response service date field 718 for specifying the date on which a pleading response was served on opposing counsel (e.g., for previously created pleadings). Frame 708 also includes a response text box 720 for providing the text of the response to the pleading selected. The response scope field 722 is used to provide the scope used for the response to a question. Once the data has been entered, the user can save the entries.

FIG. 8 is an exemplary discovery type user interface screen for specifying pleading types and sets for a pleading. In an exemplary embodiment of the present invention, up to three different pleading types may be selected in fields 802, as well as up to three corresponding pleading sets in fields 804. These pleading types and sets correspond to a discovery set, which in turn, contains production folders and discovery information for a case. The contents of each discovery set are assembled to address the questions put forth in an individual pleading received for the case. The user enters the desired discovery type data and then saves the information by selecting the 'OK and Save' button 806.

As indicated above, the second module of the pleading management system is a question and answer search module. Using the question and answer search module, a user may search for pleading information stored in the data storage device 108 via a search tool. The LSA provides access to previously entered pleading, question, response, discovery, and production information. The search function's flexibility combined with the information available for each question record provide an efficient means to find the data and documents needed to create consistent productions in response to pleadings. For example, if a user wants to review all of the responses provided to address questions concerning a specific product defect allegation entered into the LSA in the last ninety days, the user may create a search to return all relevant question and response records. In another example, if a user desires to research documents that have been produced in response to questions regarding the design of a product (e.g., fuel tanks), the user may create a search that would return only those question records that fit this description. For each question record that is returned in the above examples, the user would be able to review question and response information and view a list of documents produced in response to those questions that had been produced through another application of the LSA. If applicable, these production documents may be reused for other parties involved in a litigation matter and/or for other cases. The search functionality is not limited to a single case and it may span pleading information associated with numerous cases stored in the databases on the storage device 108.

Figure 9:
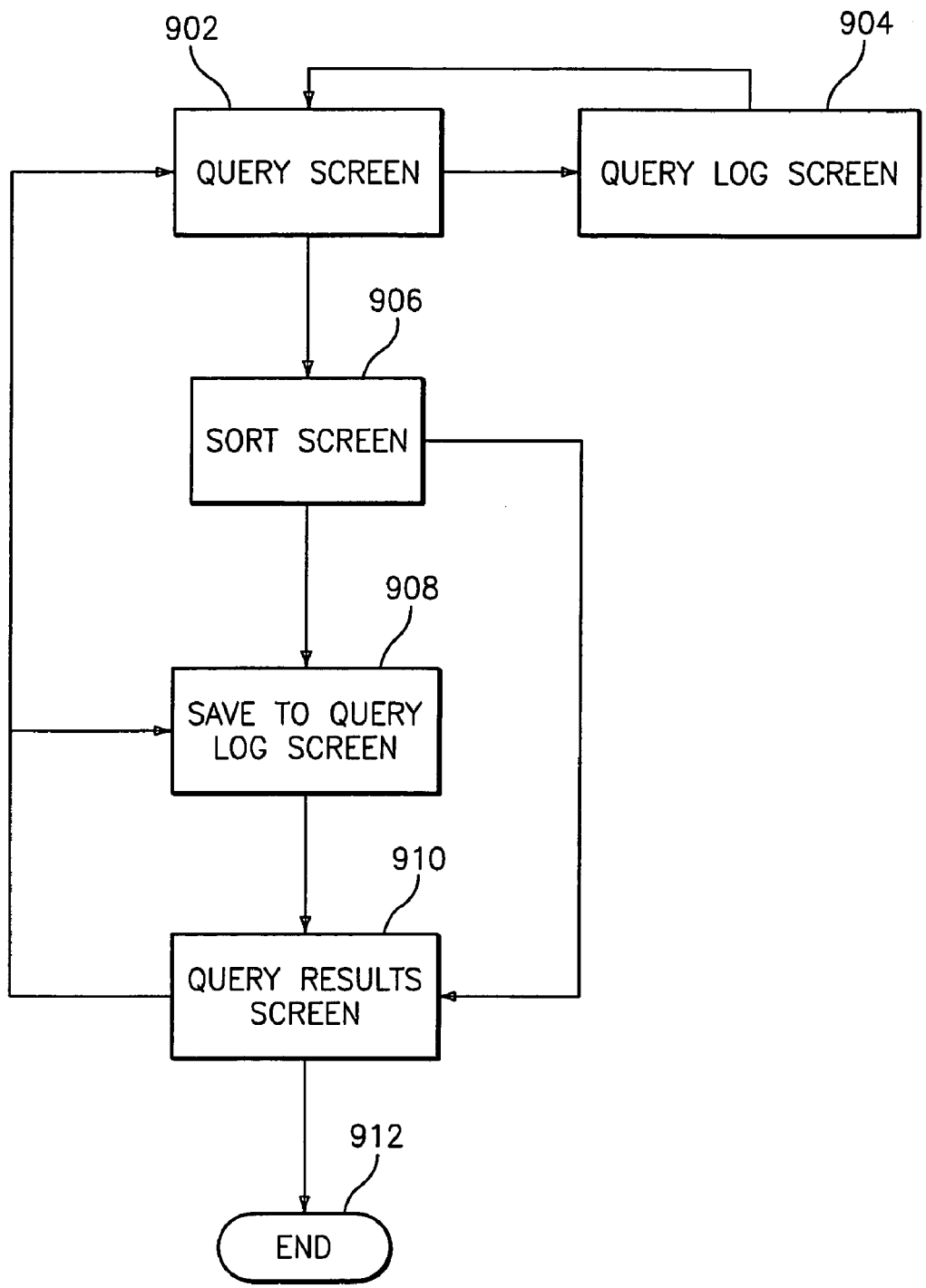
FIG. 9 is a flow diagram of an exemplary screen flow for conducting pleading information searches.
Figure 10:
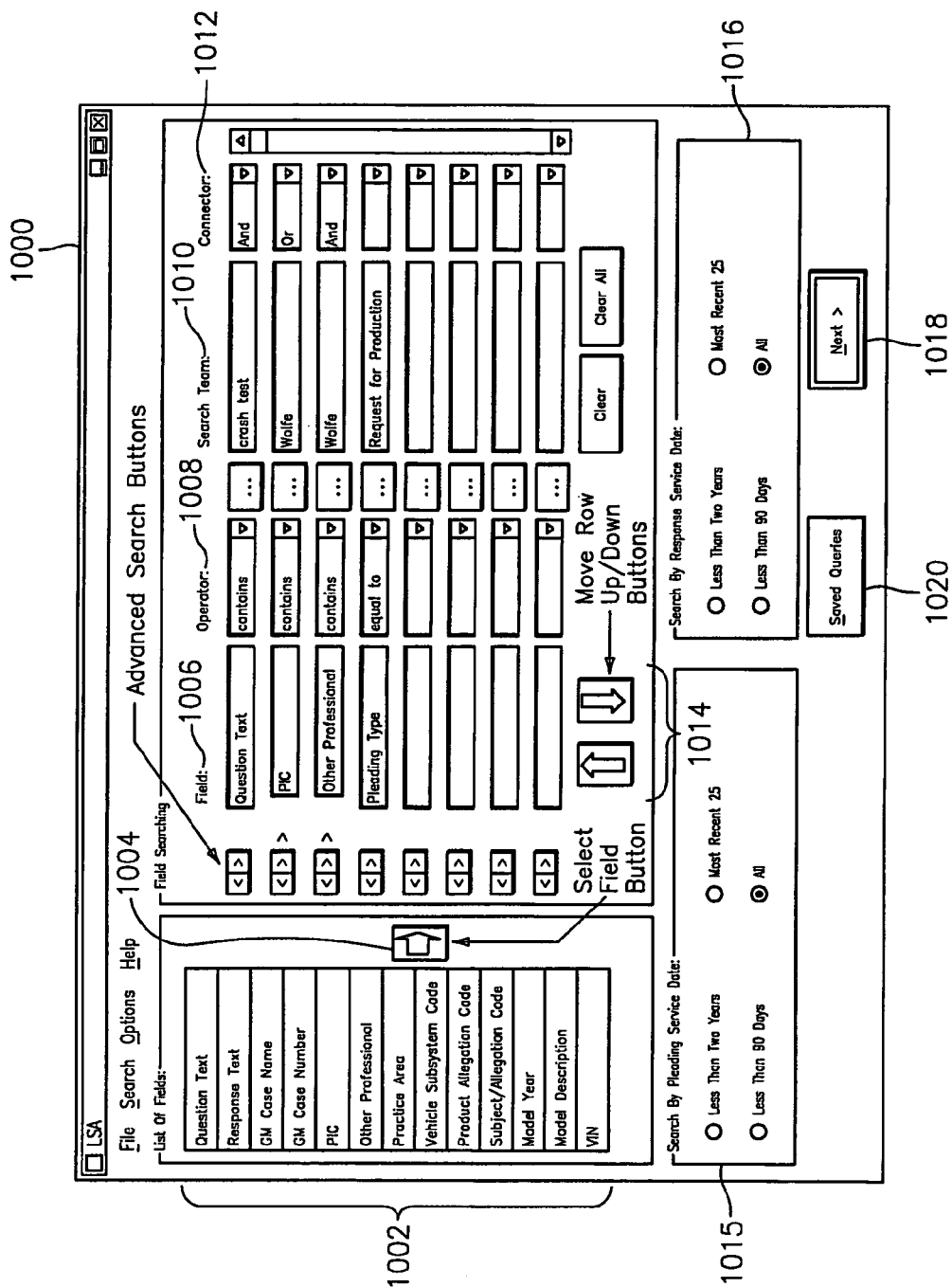
FIG. 10 is an exemplary interface screen for building new search queries and viewing existing search queries.
Figure 11:
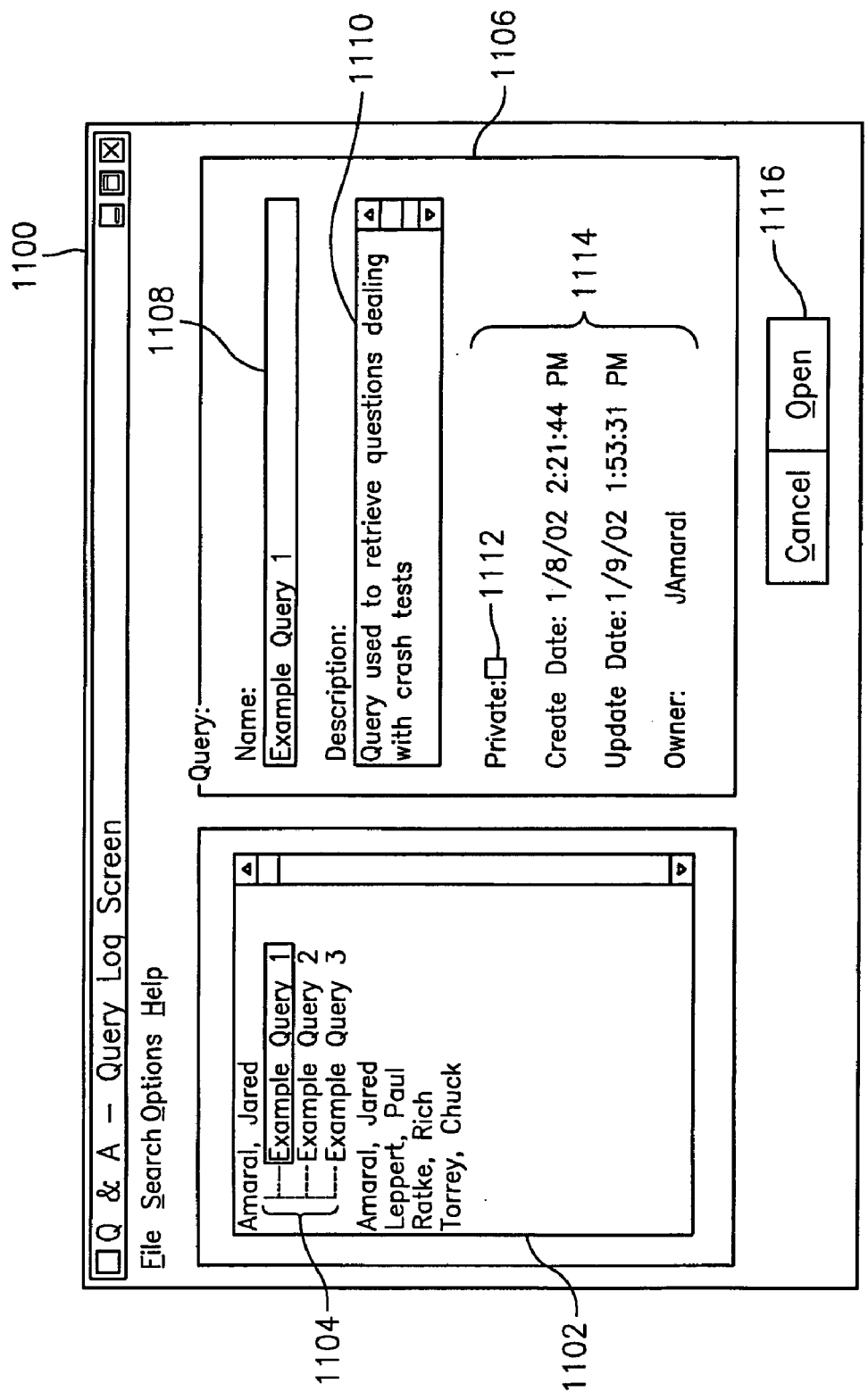
FIG. 11 is an exemplary user interface screen for selecting previously-created search queries.

FIG. 9 is a flow diagram of an exemplary screen flow for viewing, building, and/or modifying a search query and for performing associated searches for pleading information. At 902, a query interface screen, such as the one depicted in FIG. 10, is presented to the user to aid in searching for pleading, question and response records. The user may input a new search, use a pre-created search from the query log, or modify a pre-created search from the query log. If the user uses a pre-created search from the query log, a query log screen, such as the one depicted in FIG. 11 is presented to the user at 904. The query log screen allows the user to search the query log for existing searches and to modify the existing search if desired. After 904 is completed, processing continues at 902.

Figure 12:
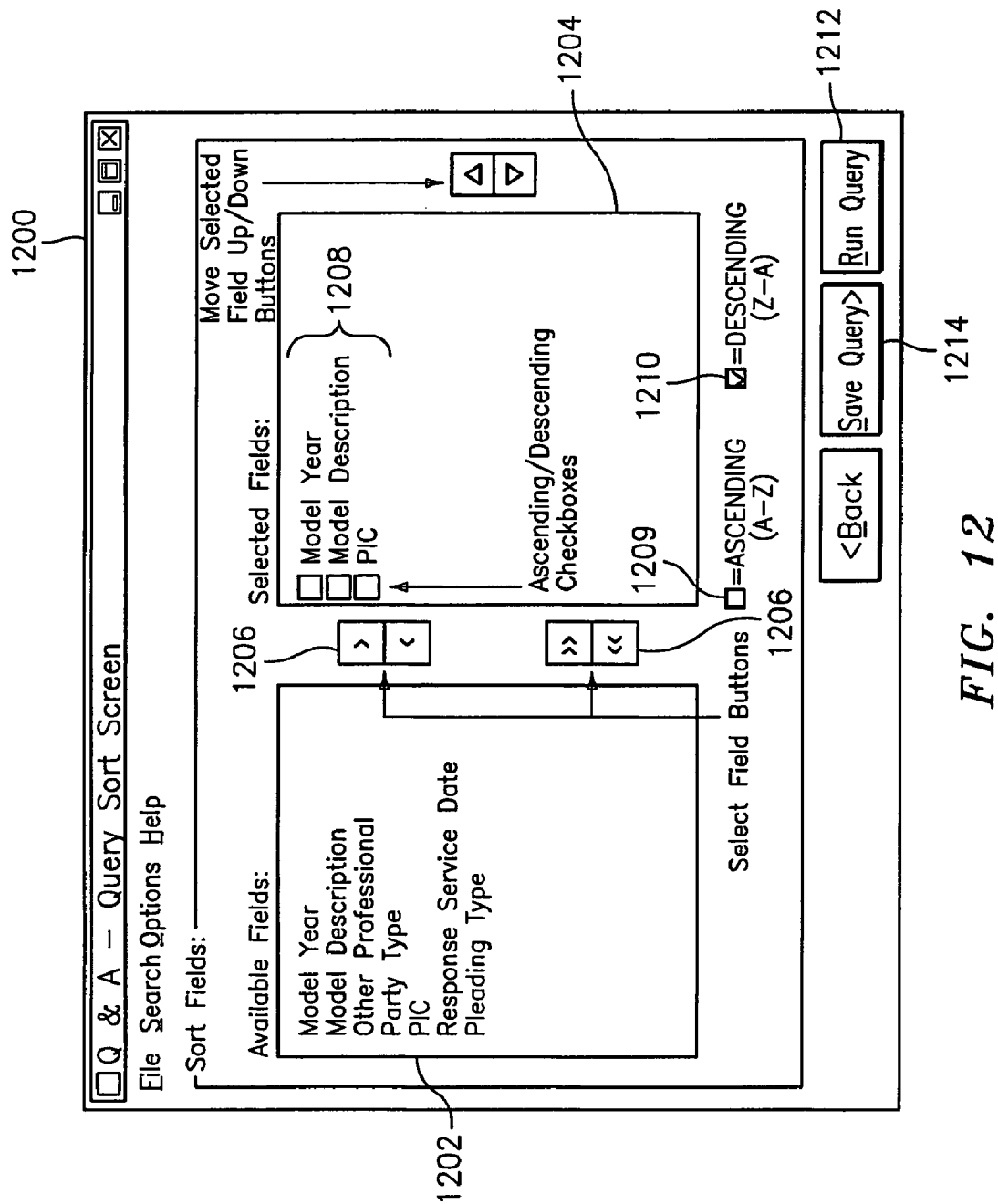
FIG. 12 is an exemplary user interface screen for specifying sort preferences relating to results of pleading information searches conducted.

After 902 is completed, processing continues at 906. At 906, a sort screen is presented to the user to allow the user to assign a sort order to the search criteria. A sample sort screen user interface is depicted in FIG. 12. After the processing at 906 is completed, processing may continue at 908 or 910, depending on user selection. At 908, the user may save the query to the query log screen using a user interface such as the one depicted in FIG. 13. At 910, the query results are presented to the user. The user can then save the query at 908, go back and create a new query at 902, or exit the question and answer module at 912.

FIG. 10 depicts a query user interface screen 1000. Referring to FIG. 10, the user may select one or more fields from a list of fields 1002, to create user defined search parameters based on fields contained in the tables described in reference to FIG. 2. User defined search parameters include one or more of allegation, party name, product information, text, attorney name, jurisdictions, dates, law firms, and any other basic case information that the users identify as being useful to them. A navigation button 1004 is used for this selection resulting in the selected field appearing in a field box 1006. The user then selects an operator 1008 for each selected field. A search term or phrase is entered in search term box 1010. This search term or phrase is the subject of the operation specified by the operator 1008. Multiple strings of search criteria may be concatenated by selecting a connector 1012 which links the selected criteria together. Navigation buttons 1014 are provided for scrolling between criteria strings.

The query user interface screen 1000 also enables a user to further refine a search by a pleading service date or response service date. Frame 1015 enables a user to search by pleading service date by selecting one of four time-based search options (e.g., less than two years, less than ninety days, most recent twenty-five, or all). Likewise, frame 1016 enables the user to search by response service date in the same manner provided via frame 1015. Once completed, the user selects the 'next' option 1018, and a query sort user interface screen is presented to the user.

If the query shown in the query user interface screen 1000 is not acceptable to the user, then the user may either perform another query search or may modify the search criteria for the existing query. To search for another query, the user selects the 'Saved Queries' option 1020 on the query user interface screen 1000 and the query log user interface screen 1100 depicted in FIG. 11 is presented to the user. If, on the other hand, the user desires to modify the exiting search query, the user may do so by selecting new criteria via the search fields 1002 and 1006–1012 provided in the query user interface screen 1000. Once the modification of the query been completed, or alternatively (as indicated above), once the search criteria has been entered for a new query, the user selects the 'Next' option 1018 and a query sort user interface screen such as the one depicted in FIG. 12 is presented to the user.

A sample query log user interface screen 1100 is shown in FIG. 11. Upon opening the query log user interface screen 1100, a user is presented with a user tree 1102. The user tree 1102 lists the names of all users that have previously saved queries in the LSA. The user's name appears highlighted at the top of screen 1100, along with the user's saved queries 1104. Other user names may be listed in alphabetical order within user tree 1102. The user may navigate through the user tree and may view and/or open all public queries saved beneath each user name. The user will only be able to view and open private queries in which he/she is the owner. If the user opens a query owned by another user, it may be modified and saved to the current user's folder through a 'save as' function.

The user selects from the list of saved queries 1104 identified in the user tree 1102 of the query log user interface screen 1100, which is displayed in frame 1106. Frame 1106 includes the query name in box 1108 and a description of the query's function or purpose in box 1110. A private query indicator box 1112 is checked if the user has opted to identify the query as private (e.g., inaccessible to other users). If box 1112 is not checked, the query is considered public and will be accessible to other users. Other information provided in frame 1114 includes the date the query was created and updated, as well as the name of the query's owner. If satisfied with the selected query, the user clicks on the 'Open' button and returns to the query user interface screen 1000 of FIG. 10. This time, a query user interface screen, such as the one depicted in FIG. 10, is populated with search criteria previously established for the query.

A sample query sort user interface screen 1200 is shown in FIG. 12. Screen 1200 allows a user to assign a sort order to the search criteria. The user selects the sort criteria in a query sort user interface screen 1200 by selecting from available sort fields in frame 1202, which is facilitated by the use of navigation buttons 1206. The selected fields are then displayed in a selected fields frame 1204 as shown in FIG. 12. These selected fields may be further sorted in ascending or descending order by selecting one of boxes 1209 and 1210, respectively. Once the sort criteria have been entered, two options are available for the user. The user may either run the search without saving the query or may save the query without running (or alternatively, before running) the query. To run the query, the user selects the 'Run Query' option 1212 on user interface screen 1200, and the LSA searches pleading textual information in the storage device 108. As described above, various discovery information may be linked to the pleading textual information via the discovery tracking number described above. Running this query will result in retrieval of the productions in addition to the pleading information results. These results are presented to the user via a query results user interface screen, a sample of which is shown in FIG. 14.

Figure 13:
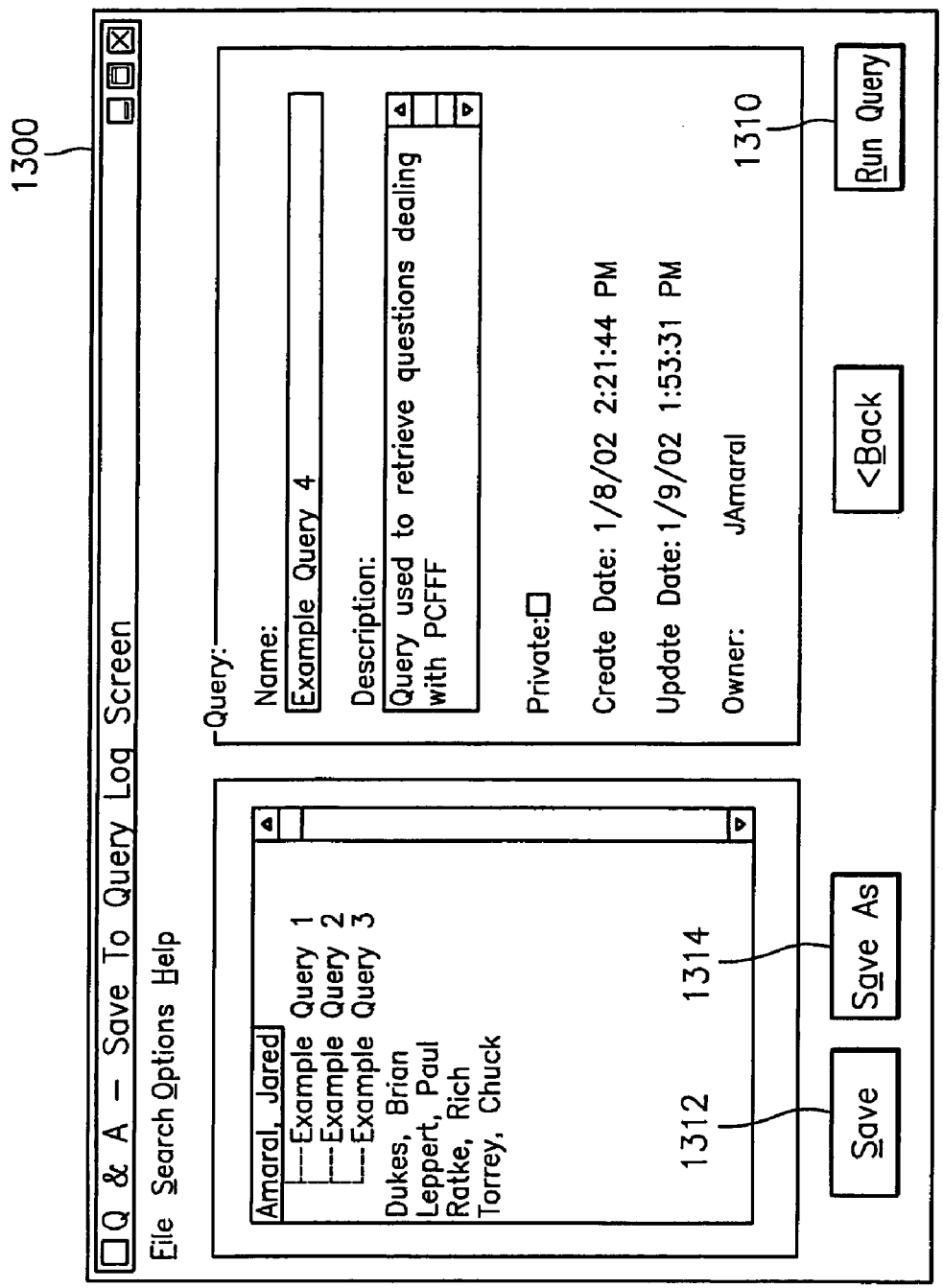
FIG. 13 is an exemplary user interface screen for saving search queries to a query log.

A sample 'save to query log' user interface screen is shown in FIG. 13. The functionality of the save to query log user interface screen 1300 is similar to that described in reference to the query log user interface screen 1100 depicted in FIG. 11 with some minor exceptions. The save to query log user interface screen 1300 allows a user to run a query if desired by selecting the 'run query' option 1310 on user interface screen 1300, save the query by selecting the 'save' option 1312, or save the query with a new name in the user's folder by selecting the 'save as' option 1314 (e.g., if the user is not the owner of the query). The user may execute the query by selecting the 'run query' option 1310, whereby the LSA searches pleading textual information in the storage device 108 for matching data. The results of the search are then presented to the user via query results user interface screen 1400 such as the one depicted in FIG. 14.

Figure 14:
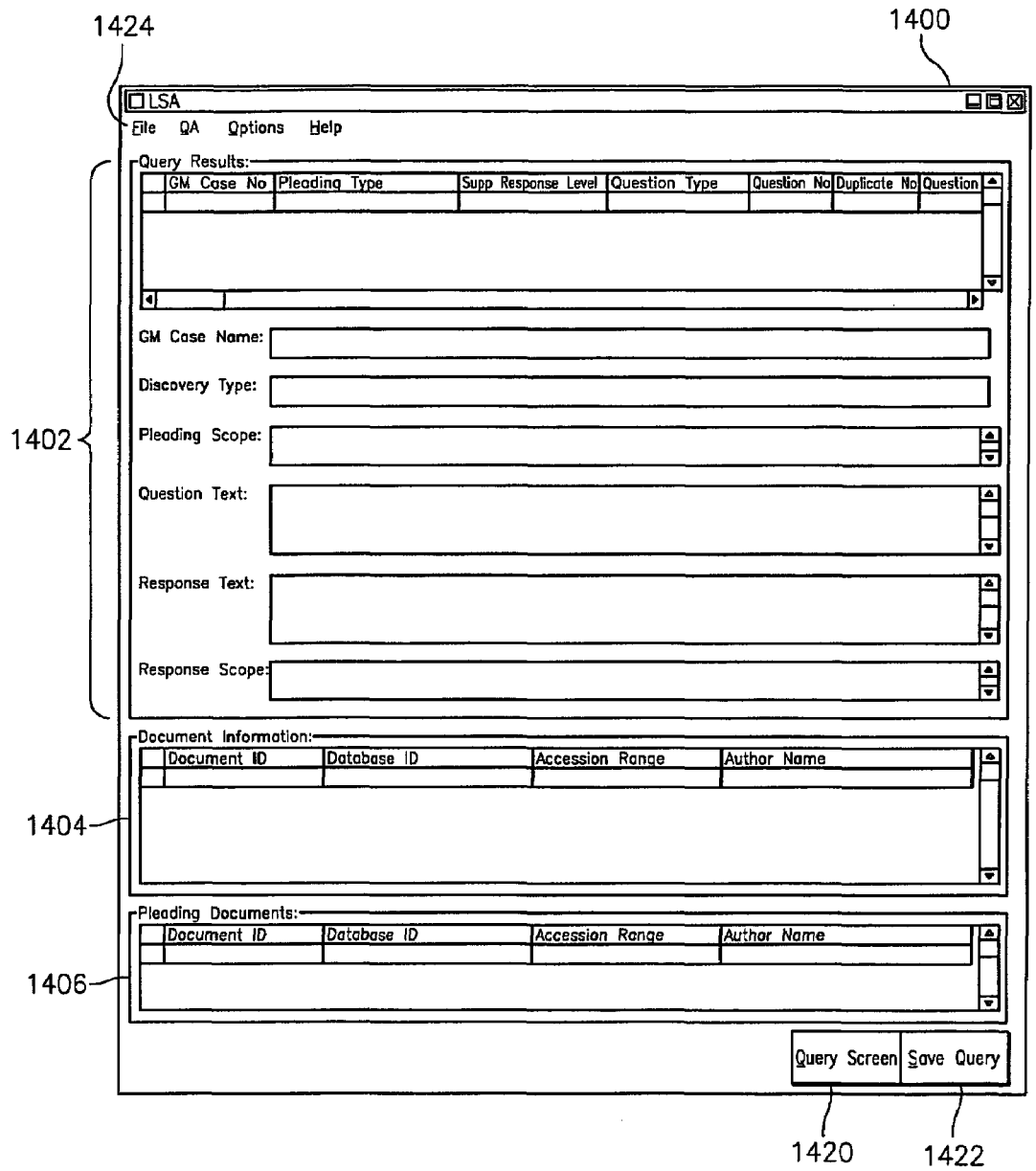
FIG. 14 is an exemplary user interface screen for displaying the results of a pleading information search.

Referring to FIG. 14, the query results user interface screen 1400 displays the results of the query which is based upon the user-defined search criteria described above. The results are displayed in three frames, a query result frame 1402, a document information frame 1404, and a pleading documents frame 1406. The query results frame 1402 contains the questions and responses, along with other pleading and case information that match the search criteria entered. In an exemplary embodiment of the present invention, only produced documents are displayed. The query results frame 1402 also contains pleading textual information including such as the case name, discovery type, pleading scope, question text, response text, and response scope information. The document information frame 1404 contains a list of discovery documents that have been produced as part of the response to the question selected in the query results frame 1402. The pleading documents frame 1406 displays a list of pleading documents generated in response to the selected question. From this frame 1406, a user may access the images of pleading documents received by highlighting and double-clicking a document from frame 1406. As indicated above, this information (e.g., production documents) may be used in other litigation matters if desired. For example, if a search query results in questions and/or responses that are similar to those related to a current litigation matter, a user may access the questions, responses, and/or documents produced in response to these questions and/or responses identified in the search results and apply these questions, responses, and/or production documents to the current litigation matter. The scope of similarities between the pleadings, questions, and/or responses being searched to a current pleading, question, and/or response may involve similarities in a product involved in the litigation matter (a product model, version, usage, etc), a common defect or suspected defect relating to one or more products involved in a litigation matter, a series of standard tests performed on a specific product, among others.

The user may either save the query results in screen 1400, perform another search, or exit the search feature. If another search is desired, the user selects the 'query screen' option 1420 of user interface screen 1400 and the user is presented with the query user interface screen 1000 depicted in FIG. 10. If the user does not wish to search again, the user selects the 'File' option 1424 on user interface screen 1400, followed by 'Exit' (not shown) to exit the search feature. If the user desires to save the query, the 'Save Query' option 1422 is selected and a user interface screen, such as the one depicted in FIG. 13, is presented to the user. Alternatively, if the user desires to save the query without executing it, the user selects 'Save Query' 1214 on screen 1200, and a user interface, such as the one depicted in FIG. 13, is presented to the user.

As indicated above, if the user is modifying a search query that is owned by another user, the user must save the modified search query under a different name. If the user is the original creator of the search query being edited, the user may either save the modified query, writing over the existing query, or may alternatively save the modified query under a new name.

Additionally, existing search queries may be viewed, searched, and modified and, upon execution of a search, result in the display of one or more cases containing information requested in the search query. A user may also build and run new search queries. Because pleadings may be linked to corresponding discovery information produced in response to the pleadings, execution of a search query will result in the identification of these corresponding discovery information in addition to question and response text. Among other advantages, this functionality enables a user to identify how specific pleadings were responded to in the past and, if appropriate, these pleading elements may be copied for reuse in other pleadings.

Exemplary embodiments of the present invention store both historical pleading textual information and produced document information. Additionally, a link is provided at the pleading and question level to historical documents produced in response to the historical pleadings. Further, the historical produced documents may be reused through the ability to copy the documents to a new production folder so as to form a consistent basis for a new production responsive to a similar request. The ability to manage pleadings and document information across cases or matters and the link between pleadings and the documents produced allows for documents that were produced for an earlier case or question to be reused for other productions.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for electronically managing discovery pleading information, comprising: a repository of prior discovery requests received and corresponding responses made to those prior requests including the documentary and other information previously produced in response to the prior discovery request and a search tool enabling a user having an instant discovery request to search the repository to locate at least one prior discovery request of interest, the search tool further enabling the user to link a least one of the documentary and other information previously produced in response to the prior discovery request located to the instant discovery request, thereby to promote efficiency and consistency in responding to discovery requests.

2. The system of claim 1 wherein the corresponding responses further include the textual response itself to the prior discovery request.

3. The system of claim 1 wherein the search tool includes prior search inquiries that may be wholly or partially reused in searching the repository.

4. The system of claim 1 wherein the link only links to the documentary and other information previously produced in response to the prior discovery request that has not been identified as privileged.

5. The system of claim 1 wherein the link restricts access to the documentary and other information previously produced in response to the prior discovery request that has been identified as privileged.

6. The system of claim 1 wherein the prior discovery request and the instant discovery request are associated with the same case.

7. The system of claim 1 wherein the prior discovery request and the instant discovery request are associated with different cases.

8. The system of claim 1 wherein the link provides for assigning a tracking number associated with the prior discovery request to the instant discovery request.

9. The system of claim 1 wherein the search tool further provides a listing of the documentary and other information previously produced in response to the prior discovery request located.

10. The system of claim 1 wherein the link provides for coping the documentary and other information previously produced in response to the prior discovery request located.

11. The system of claim 10 wherein the copied documentary and other information previously produced in response to the prior discovery request located is manipulated.

12. The system of claim 10 wherein the copied documentary and other information previously produced in response to the prior discovery request located is manipulated.

13. A system for electronically managing discovery pleading information, comprising; a repository of prior discovery requests received and corresponding responses made to those prior requests including the documentary and other information previously produced in response to the prior discovery request, and a search tool enabling a user having an instant discovery request to search the repository to locate at least one prior discovery request of interest, the search tool automatically links at least one of the documentary and other information previously produced in response to the prior discovery request located to the instant discovery request, thereby to promote efficiency and consistency in responding to discovery requests.

14. The system of claim 13 wherein the search tool includes prior search inquiries that may be wholly or partially reused in searching the repository.

15. The system of claim 13 wherein the link only links to the documentary and other information previously produced in response to the prior discovery request that has not been identified as privileged.

16. The system of claim 13 wherein the link restricts access to the documentary and other information previously produced in response to the prior discovery request that has been identified as privileged.

17. The system of claim 13 wherein the prior discovery request and the instant discovery request are associated with the same case.

18. The system of claim 13 wherein the prior discovery request and the instant discovery request are associated with different cases.

19. The system of claim 13 wherein the link provides far assigning a tracking number associated with the prior discovery request to the instant discovery request.

20. The system of claim 13 wherein the search tool further provides a listing of the documentary and other information previously produced in response to the prior discovery request located.

21. The system of claim 13 wherein the link provides for coping the documentary and other information previously produced in response to the prior discovery request located.

22. A method for electronically managing discovery pleading information, comprising: storing prior discovery requests received and corresponding responses made to those prior requests including the documentary and other information previously produced in response to the prior discovery request; using an instant discovery request to search the stored prior discovery requests to locate at least one prior discovery request of interest; and linking at least one of the documentary and other information previously produced in response to the prior discovery request located to the instant discovery request, thereby to promote efficiency and consistency in responding to discovery requests.

23. The method of claim 22 wherein the searching further includes searching prior search inquiries that may be wholly or partially reused.

24. The method of claim 22 wherein the linking further comprises linking only the documentary and other information previously produced in response to the prior discovery request that has not been identified as privileged.

25. The method of claim 22 wherein the linking restricts access to the documentary and other information previously produced in response to the prior discovery request that has been identified as privileged.

26. The method of claim 22 wherein the prior discovery request and the instant discovery request are associated with the same case.

27. The method of claim 22 wherein the prior discovery request and the instant discovery request are associated with different cases.

28. The method of claim 22 further comprises assigning a tracking number associated with the prior discovery request to the instant discovery request.

29. The method of claim 22 further comprises listing of the documentary ant other information previously produced in response to the prior discovery request located.

30. The method of claim 22 further comprises coping the documentary and other information previously produced in response to the prior discovery request located.

31. The method of claim 30 further comprising manipulating the copied documentary and other information previously produced in response to the prior discovery request located.

32. The method of claim 22 wherein the linking is enabled by a user.

33. The method of claim 22 wherein the linking is automatic.

* * * * *